H. R. HUGHES.
ROTARY BORING DRILL.
APPLICATION FILED DEC. 30, 1914.
1,209,299.
Patented Dec. 19, 1916.
2 SHEETS—SHEET 1.
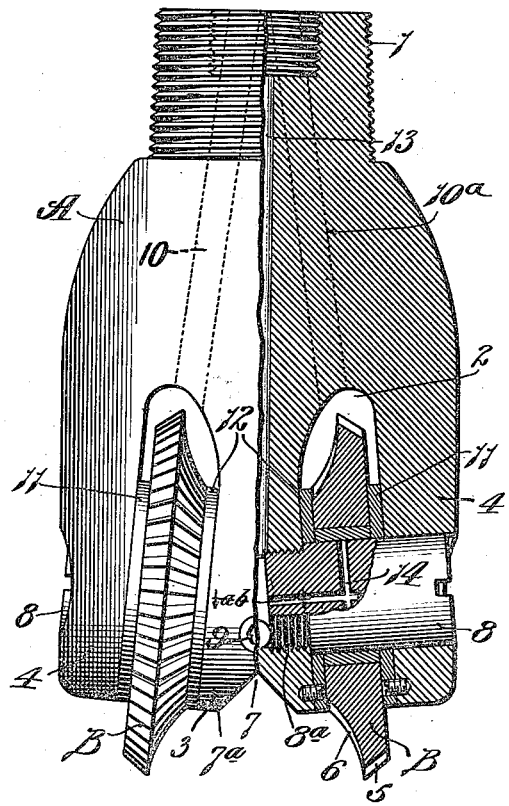
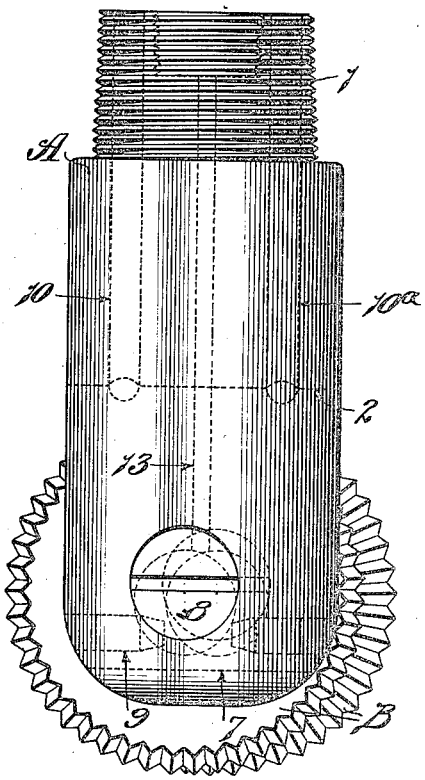
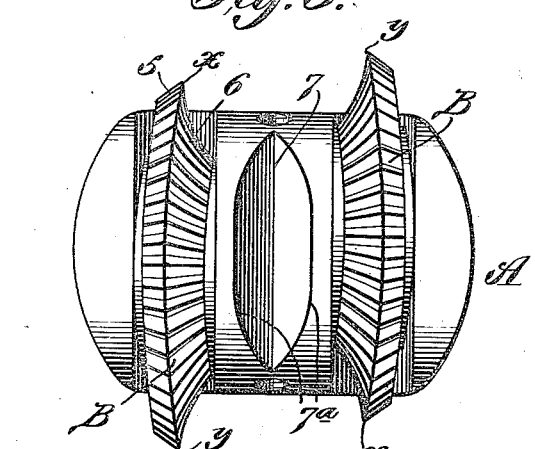
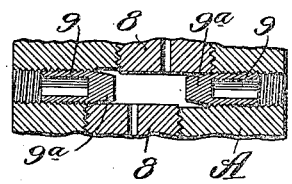
Inventor,
Howard R. Hughes.
By Bakewell & Church, Attys.

H. R. HUGHES.
ROTARY BORING DRILL.
APPLICATION FILED DEC. 30, 1914.
1,209,299.
Patented Dec. 19, 1916.
2 SHEETS—SHEET 2.
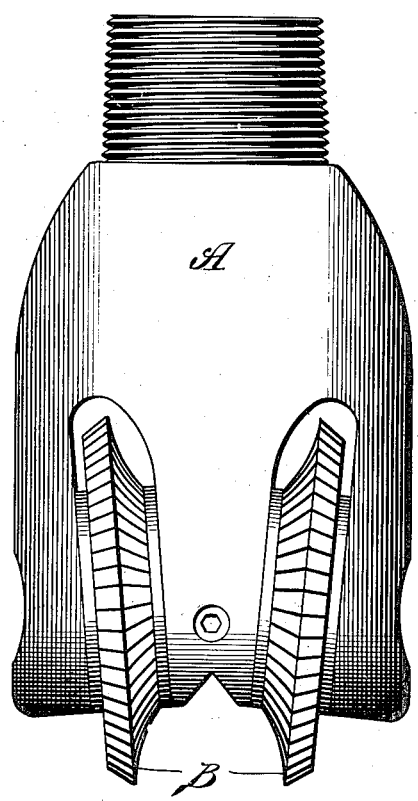
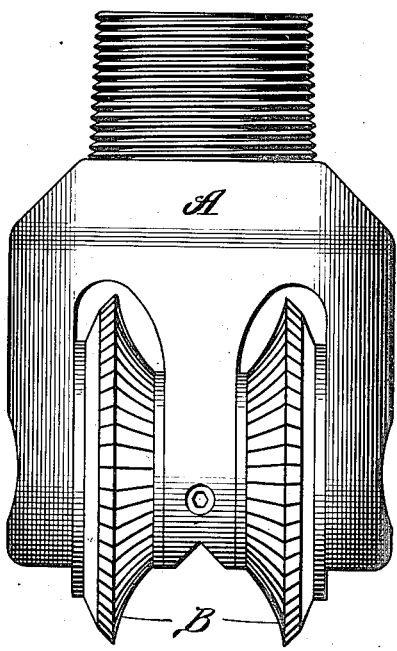
Inventor,
Howard R. Hughes.

UNITED STATES PATENT OFFICE.

HOWARD R. HUGHES, OF HOUSTON, TEXAS, ASSIGNOR TO SHARP-HUGHES TOOL COMPANY, OF HOUSTON, TEXAS, A CORPORATION OF TEXAS.

ROTARY BORING-DRILL.

1,209,299.

Specification of Letters Patent.

Patented Dec. 19, 1916.

Application filed December 30, 1914. Serial No. 879,787.

*To all whom it may concern:*

Be it known that I, HOWARD R. HUGHES, a citizen of the United States, residing at Houston, Texas, have invented a certain new and useful Improvement in Rotary Boring-Drills, of which the following is a full, clear, and exact description, such as will enable others skilled in the art to which it appertains to make and use the same.

This invention relates to rotary boring drills of the type that are commercially known as disk drills or disk bits, and which are equipped with one or more substantially disk-shaped cutters that shear off the material at the side of the hole when the drill is in operation.

One object of my present invention is to provide a disk drill which is so designed that there is little liability of the disintegrated material or "cuttings" packing around or lodging behind the disks, thus preventing them from rotating when the drill is operating in comparatively soft formations, such, for example, as gumbo and clay.

Another object is to provide a disk drill whose cutters or disks are of such design that they have sufficient traction on the bottom of the hole to insure constant turning of the disks, thereby obtaining the maximum cutting efficiency of the disks.

Another object is to provide a disk drill which is of such design that when made in small sizes it is strong enough to successfully withstand the enormous weight and pressure of a long drill stem, thereby making it possible to use a small disk drill for boring deep holes.

Another object is to provide a disk drill which is so designed that the head can be cast instead of forged, thus reducing the cost of manufacturing the drill.

Another object is to provide a disk drill in which a stream of flushing water is discharged downwardly on the lead side of each disk in such a manner that the disintegrated material cannot cling to the edges of the disk or pack in the open spaces in the head of the drill in which the disks are arranged. And still another object is to provide a disk drill which is so designed that the disintegrated material that is flushed out of the hole will pass upwardly between the edge portions of the disks, and the side wall of the hole will tend to hold the head of the drill centered, thus insuring the formation of a straight hole.

Other objects of my present invention are, to provide a disk drill which is equipped with a novel means for destroying the core at the center of the hole.

Figure 1 is a front elevational view partly in vertical section of a disk drill constructed in accordance with my invention. Fig. 2 is a side elevation of said drill. Fig. 3 is a bottom plan view of same. Fig. 4 is a detail sectional view taken on the line *a—b* of Fig. 1; and Figs. 5 and 6 are side elevational views illustrating slight modifications of my invention.

Referring to Figs. 1 to 3 of the drawings which illustrate one form of the invention, A designates the head of the drill which is substantially oblong shaped in cross section and provided at its upper end with a threaded portion 1 for connecting the head to a hollow drill stem (not shown), the two oppositely disposed narrow side faces of the head being rounded off, as shown more clearly in Fig. 3, so that the head will conform approximately to the shape of the hole in one of its dimensions, and thus remain centered in the hole. The drill shown in Figs. 1 to 3 is provided with two substantially disk-shaped cutters B that are arranged in a substantially upright or vertical position in two pockets 2 that extend transversely through the small diameter of the head, or, in other words, extend approximately at right angles to the axes of rotation of the disks, thus providing a center bearing 3 on the head that lies between the two disks and intermediate two side bearings 4 that lie outside of the disks. The disks can be arranged in the manner shown in Fig. 1, namely, with their upper portions inclined inwardly toward the vertical axis of the head, or in the manner shown in Fig. 5, namely, with their lower portions inclined inwardly toward the vertical axis of the head, or in the manner shown in Fig. 6, namely, in a vertical position, and in parallel relation with each other. I also prefer to offset the axis of one disk slightly with relation to the other, as shown in Fig. 3, so that the rear edges *x* of the disks will not drag against the side wall of the hole and thus wear out rapidly when the advancing edges *y* of the disks are acting on the side wall of the hole.

The disks are of such design that they have sufficient traction on the bottom of the hole to insure the disks turning constantly when the drill is in operation, thereby preventing the cutting edges of the disk from wearing out at one point, as would be apt to occur if they remained stationary or did not revolve on their axes when the head of the drill is rotating. As shown in Fig. 1, each of the disks B has a beveled edge or periphery that is provided with cutting teeth 5 that extend transversely across said edge, the edge of each disk being tapered or beveled in the manner shown in Figs. 1 and 3, so that the edge portion of the disk will conform approximately to the circular shape of the hole. Each disk is also provided on its inner side with radially disposed cutting teeth 6 that are preferably curved slightly, as shown in Fig. 1, and whose outer ends terminate at the inner ends of the transverse teeth 5 in the edge of the disk. When the drill is in operation the lower portions of the disks that project downwardly beyond the lower end face of the drill head A sink into the material at the bottom of the hole, and thus form an annular channel or groove around a center core, which is destroyed progressively by a cutting means arranged on the lower end of the head A between the disks B. In the drill herein shown said cutting means consists of a substantially inverted V-shaped groove 7 that extends transversely across the narrow diameter of the head between the disks B, as shown in Figs. 1 and 3. It will be obvious, however, that various other means could be employed for progressively destroying the core at the center of the hole, and therefore, I wish it to be understood that my invention is not limited to a drill whose head is provided with stationary cutting edges 7ª formed by an inverted V-shaped groove for destroying the core. The radial teeth 6 and transverse teeth 5 on the disks coöperate with the stationary cutting edges 7ª on the head to disintegrate the material at the bottom of the hole, and the radial teeth 6 on the inner sides of the disks materially increase the traction of the disks on the bottom of the hole, thus insuring the constant turning of the disks when the drill is in operation. In other words, the cutting surfaces on the inner sides of the disks not only disintegrate and pulverize the material at the bottom of the hole, but they also materially assist the transverse teeth 5 on the edges of the disks to revolve the disks about their axes when the drill is in operation. While I have stated that the disks are provided on their edges with transversely-disposed cutting teeth and on their inner sides with radially-disposed cutting teeth, I wish it to be understood that it is immaterial, so far as my invention is concerned, what particular type of cutting surfaces are used on the edges and on the inner sides of the disks, so long as they are of such form that they will crush and pulverize the material and also cause the disks to turn or revolve, and thus bring different portions of the disks into position to act on the side wall of the hole.

The disks B can be mounted in the head A in various ways without departing from the spirit of my invention, but I prefer to mount each disk on a pin or journal 8 whose inner end is supported in the center bearing 3 of the head and whose outer end is supported in one of the side bearings 4 of the head. The pins 8 of the drill herein shown are provided at their inner ends with screw-threaded portions 8ª that are screwed in the center bearing 3, and means are employed for locking each of said pins in the head so that it can not unscrew or work loose, the means herein shown for this purpose consisting of hollow set screws 9 or other suitable removable devices in the head provided at their inner ends with wedge-shaped portions 9ª, as shown in Fig. 4, that are wedged tightly against the inner ends of the pins 8, one of said locking devices 9 being provided for each pin 8.

The head A of the drill is provided with water courses or passageways which are so disposed that a jet of flushing water will be discharged downwardly onto the lead side of each disk, and thus prevent the disintegrated material from clinging to the edge portions of the disks or from packing in the open spaces 2 in the head in which the disks are arranged.

In the form of my invention herein shown the head is provided with two water courses or passageways 10 and 10ª, one leading downwardly to one of the disks B and the other leading downwardly to the other disk, as shown in broken lines in Figs. 1 and 2.

By housing the disks in the head of the drill I eliminate the possibility of the disintegrated material or cuttings packing around the disks, and thus prevent them from turning when the drill is operating in soft formations; and still another advantage of such a construction is that bearings are provided for both the inner and outer ends of the pins or journals on which the disks revolve. In other words, instead of mounting the disks on spindles that project radially from a head of comparatively small dimensions, as has heretofore been the general practice in disk drills, my improved drill is provided with a head that houses and protects the upper portions of the disks and also supports the outer ends of the journals on which the disks turn. The head of the drill can be formed conveniently from a casting, owing to the fact that it comprises sufficient metal to firmly support the members on which the disks revolve, and consequently, the drill can be manufactured at a lower cost than a drill provided with a forged head. Furthermore, the head is large enough and is so designed that it tends to remain centered in the hole, by reason of the fact that it comprises two oppositely-disposed portions having side faces that conform approximately to the circular shape of the hole, the long dimension of the head being only slightly less than the diameter of the hole, so that there will be no tendency for the head to wabble and thus produce a crooked hole when the drill is in operation.

The disks B are preferably mounted on bushings 11 on the pins 8, and washers 12 are arranged between the side faces of the disks and the bearings in the head in which the end portions of the pins 8 are supported. The head is also provided with a lubricating duct 13, shown in Fig. 1 that leads downwardly from a lubricant holder (not shown) to distributing lubricating ducts 14 formed in the pins or journals 8.

A drill of the construction above described can be made strong enough in small sizes to successfully withstand the enormous weight and pressure of a long drill stem, thus enabling the drill to be used at great depth for boring small holes, and the drill is of such design that it can be manufactured at a low cost; it will form a straight hole rapidly on account of the relatively great cutting area of the cutting surfaces on the disks and on the head; the disks will not wear out rapidly, owing to the fact that they have sufficient traction on the bottom of the hole to insure their turning constantly and the disks are so arranged on the head that the rear edges of same will not drag on the side of the hole; and still another advantage of such a drill is that there is little liability of the disintegrated material or cuttings clinging to the edge portions of the disks or packing in the head around the disks when the drill is being used in gumbo, clay and other soft formations.

Having thus described my invention, what I claim, and desire to secure by Letters Patent, is:

1. A disk drill comprising a substantially disk-shaped cutter provided on its periphery with a cutting surface and arranged in such a manner that it forms an annular groove in the bottom of the hole and simultaneously removes the material from the side wall of the hole at a point some distance above the bottom of the hole, one of the upright side faces of said cutter being equipped with a roughened cutting surface, separate and distinct from the cutting surface on the periphery of the cutter that acts on one of the side walls of said groove.

2. A disk drill having a substantially disk-shaped cutter arranged in an upright position and projecting laterally and downwardly from the head of the drill so that the edge portion of same will shear off the material from the side wall of the hole and form an annular groove in the bottom of the hole some distance inwardly from the side wall, said cutter being provided on one of its upright side faces and on its periphery with separate and distinct sets of cutting teeth.

3. A disk drill having a vertically-disposed, substantially disk-shaped cutter arranged in the head of the drill with its lower portion and one of its side portions projecting from the head, and provided on its periphery with a toothed cutting surface that shears off the material from the side wall of the hole and forms an annular groove in the bottom of the hole, said cutter being provided with an independent toothed cutting surface that acts on the inner side wall of said groove and which is disposed at an angle to the cutting surface on the periphery of the cutter.

4. A disk drill having a vertically-disposed, disk-shaped cutter that projects from the lower end and from the side of the drill head and thus shears off the material from the side wall of the hole and forms a groove in the bottom of the hole, said cutter being provided on its periphery and on one of its side faces with independent roughened cutting surfaces.

5. A disk drill having a substantially disk-shaped cutter arranged in such a manner that the edge portion of said cutter will shear off the material at the side wall of the hole at a point some distance above the bottom of the hole and form an annular groove on the bottom of the hole at a point some distance inwardly from said side wall, said cutter being provided with a beveled cutting edge and also having a rough cutting surface on one of its upright side faces that acts on one of the side walls of said groove.

6. A disk drill, comprising a support, and a substantially disk-shaped, vertically-disposed cutter whose peripheral edge portion projects from the lower end and from one side of said support and is provided with a cutting means that shears off the material at the side of the hole and forms an annular groove at the bottom of the hole, said disk being provided on one of its side faces with cutting teeth disposed at an angle to the cutting means on the peripheral edge portion of the disk, which teeth remove the material from one of the side walls of said groove and thus tend to cause the disk to revolve when the drill is in operation.

7. A cutter for disk drills, consisting of a substantially disk-shaped member that is adapted to be arranged in an upright position on a supporting structure so that the peripheral edge of same will project laterally from said structure and also below the lower end of same and thus shear off the material from the side wall of the hole and form a groove on the bottom of the hole at a point some distance inwardly from the side wall, said member having a beveled edge provided with transversely-disposed cutting teeth, and radially-disposed teeth on one side of said member whose outer ends terminate at the inner ends of said transversely-disposed teeth.

8. A disk drill, comprising a head provided in its lower end face with transversely-disposed openings that extend upwardly into the head, and substantially disk-shaped cutters arranged in an approximately vertical position in said openings and in such a manner that both cutters project from the lower end of the head and each cutter projects laterally from one side of the head, and cutting means on said cutters that shear off the material from the side wall of the hole and form an annular groove on the bottom of the hole, each of said cutters also being provided on one of its side faces with a cutting surface, disposed at an angle to said cutting means, so as to shear off the material from one of the side walls of said annular groove.

9. A disk drill, comprising a head provided with a center bearing, side bearings and integral portions that bridge the spaces between said bearings, journals that have their inner and outer ends supported in said bearings, substantially disk-shaped cutters rotatably mounted on said journals in an approximately vertical position and provided with peripheral cutting portions that extend beyond the side of the head and shear off the material on the side wall of the hole at a point above the bottom of the hole, and separate and distinct cutting teeth on each of said cutters disposed at an angle to the peripheral cutting portion of the cutter and lying between said peripheral cutting portion and the vertical axis of the drill, for the purpose described.

10. A disk drill, comprising a head, approximately disk-shaped cutters arranged in a substantially upright position on said head and projecting slightly beyond the side of the head so that the advancing edge portions of same will act on the side wall of the hole at a point above the bottom of the hole when the head is rotated, and a cutting tooth on the bottom of the head that extends at right angles to the axes of said cutters and which progressively destroys the core at the center of the hole that lies within the cutting zone of said cutters.

11. A disk drill, comprising a head provided with a pair of substantially disk-shaped cutters that project laterally in opposite directions from opposite sides of the head and which shear off the material at the side of the hole at a point above the bottom of the hole, said cutters projecting downwardly from the bottom of the head so that they will form an annular groove at the bottom of the hole, and a fixed cutting device on the bottom of the head extending transversely across same between said cutters at right angles to the axes of said cutters for destroying the core lying within said groove.

12. A disk drill, comprising a head having rotatable cutters of substantially disk form provided on their peripheries with cutting teeth and arranged in an upright position and projecting from the side of the head so that the advancing edges of same will act on the side wall of the hole while the lower portions of same are forming an annular groove in the bottom of the hole, each of said cutters also being provided on one of its side faces with a roughened cutting surface that acts on one of the side walls of said annular groove, and stationary teeth on the head arranged between the cutters for progressively destroying the core at the center of the hole.

13. A disk drill, comprising a head provided in its lower end face with a cutting means consisting of integral teeth on the head, and substantially disk-shaped cutters rotatably mounted in the head with their axes disposed at substantially right angles to said teeth, said cutters extending beyond the bottom and the side of the head so that they will shear off the material at the side of the hole at a point above the bottom of the hole and also form an annular groove in the bottom of the hole outside of the zone of the cutting means on the lower end face of the head.

14. A disk drill, comprising a head provided in its lower end face with slots that extend upwardly into the head, substantially disk-shaped cutters rotatably mounted in said slots and arranged in an upright position with one side portion of each cutter projecting outwardly so that the edges of said cutters will shear off the material from the side wall of the hole at a point above the bottom of the hole, and integral cutting teeth on the lower end face of the head that lie between said slots at substantially right angles to the axes of said cutters and which disintegrate the material on the bottom of the hole.

15. A disk drill, comprising a head provided with two spaced side bearings and an intermediate center bearing, journals supported at their outer ends by said side bearings and at their inner ends by said center bearing, substantially disk-shaped cutters rotatably mounted on said journals in an upright or approximately vertical position and provided on their peripheral edges with cutting teeth that act on the side wall of the hole, substantially radially disposed cutting edges on one side face of each of said cutters, separate and distinct from the teeth on the periphery of the cutter that act on the material at the bottom of the hole, and cutting teeth extending transversely across the lower end of the intermediate or center bearing on the head in a direction substantially parallel to said cutters for disintegrating the material at the bottom of the hole.

16. A rotary boring drill, comprising a head, a journal supported at its opposite ends in bearings on said head and provided at its inner end with a screw-threaded portion that is screwed into one of said bearings, a cutter rotatably mounted on said journal, and a removable retaining device in the head that bears against the inner end of said journal and exerts pressure on same in a direction tending to cause the screw-threaded portion of same to bind in the head.

17. A disk drill, comprising a head provided with spaced side bearings and a center bearing, journals passing freely through said side bearings and butting against said center bearing, said journals being offset slightly with relation to each other and provided at their inner ends with externally screw-threaded portions that are screwed into said center bearing, a substantially disk-shaped cutter rotatably mounted on each of said journals, and screw-threaded retaining devices in said center bearing arranged at right angles to said journals and bearing against the inner ends of same so as to exert an end thrust on each of said journals.

In testimony whereof I hereunto affix my signature in the presence of two witnesses, this 23rd day of December 1914.

HOWARD R. HUGHES.

Witnesses:
E. W. TOWNES,
MURRAY B. JONES.